United States Patent
Suzuki et al.

(10) Patent No.: US 9,422,893 B2
(45) Date of Patent: Aug. 23, 2016

(54) CONTROL APPARATUS AND METHOD FOR AN INTERNAL COMBUSTION ENGINE

(75) Inventors: Naoki Suzuki, Susono (JP); Isamu Goto, Sunto-gun (JP); Masahiko Masubuchi, Mishima (JP)

(73) Assignee: TOYOTA JIDOSHA KABUSHIKI KAISHA, Aichi (JP)

(*) Notice: Subject to any disclaimer, the term of this patent is extended or adjusted under 35 U.S.C. 154(b) by 129 days.

(21) Appl. No.: 14/115,964

(22) PCT Filed: May 13, 2011

(86) PCT No.: PCT/JP2011/061034
§ 371 (c)(1),
(2), (4) Date: Nov. 6, 2013

(87) PCT Pub. No.: WO2012/157041
PCT Pub. Date: Nov. 22, 2012

(65) Prior Publication Data
US 2014/0069384 A1 Mar. 13, 2014

(51) Int. Cl.
*F02M 25/00* (2006.01)
*F02D 41/40* (2006.01)
*F02D 41/00* (2006.01)
*F02D 19/06* (2006.01)
*F02D 19/10* (2006.01)
(Continued)

(52) U.S. Cl.
CPC ............ *F02M 25/00* (2013.01); *F02D 19/061* (2013.01); *F02D 19/0692* (2013.01); *F02D 19/105* (2013.01); *F02D 35/02* (2013.01); *F02D 41/0025* (2013.01); *F02D 41/403* (2013.01); *F02D 35/023* (2013.01); *F02D 41/0027* (2013.01); *F02M 21/0281* (2013.01); *Y02T 10/36* (2013.01); *Y02T 10/44* (2013.01)

(58) Field of Classification Search
CPC ..... F02D 19/06; F02D 19/0647; F02D 19/08; F02D 19/081; F02D 19/10; F02D 35/02; F02D 35/023
USPC ............ 123/1 A, 27 GE, 299, 300, 304, 525, 123/526, 575–578
See application file for complete search history.

(56) References Cited

U.S. PATENT DOCUMENTS 6,101,986 A * 8/2000 Brown et al. ............. 123/27 GE
6,230,683 B1 * 5/2001 zur Loye et al. ............. 123/435
(Continued)

FOREIGN PATENT DOCUMENTS

EP 1688601 A2 8/2006
JP 6-159182 A 6/1994
(Continued)

*Primary Examiner* — Stephen K Cronin
*Assistant Examiner* — Kevin R Steckbauer
(74) *Attorney, Agent, or Firm* — Sughrue Mion, PLLC (57) ABSTRACT

The present invention resides in a control apparatus for an internal combustion engine in which selective use is made of a case where a first fuel, being easy to be ignited, is caused to combust by itself, and a case where a second fuel, being hard to be ignited, is also caused to combust by igniting the first fuel, and which is provided with an acquisition unit configured to acquire a combustion state of the second fuel in the case where the second fuel is also caused to combust by igniting the first fuel, and a decision unit configured to decide amounts of supply of the first fuel and the second fuel to be supplied to the internal combustion engine on and after next time, based on the combustion state of the second fuel determined by the acquisition unit.

5 Claims, 5 Drawing Sheets

(51) Int. Cl.
  *F02D 35/02* (2006.01)
  *F02M 21/02* (2006.01)

(56) References Cited

U.S. PATENT DOCUMENTS

| | | | |
|---|---|---|---|
| 6,276,334 B1 * | 8/2001 | Flynn et al. | 123/435 |
| 6,286,482 B1 * | 9/2001 | Flynn et al. | 123/435 |
| 6,561,157 B2 * | 5/2003 | zur Loye et al. | 123/295 |
| 6,609,493 B2 * | 8/2003 | Yamaguchi et al. | 123/299 |
| 7,007,462 B2 * | 3/2006 | Kitahara | 60/285 |
| 7,870,845 B2 * | 1/2011 | Sasaki et al. | 123/435 |
| 8,428,850 B2 * | 4/2013 | Nada et al. | 701/104 |
| 8,469,009 B2 * | 6/2013 | Munshi et al. | 123/525 |
| 8,584,650 B2 * | 11/2013 | Peters et al. | 123/406.19 |
| 8,596,242 B2 * | 12/2013 | Nada | 123/299 |
| 8,849,546 B2 * | 9/2014 | Magnusson | 701/104 |
| 8,943,810 B2 * | 2/2015 | Masubuchi | 60/295 |
| 2010/0043744 A1 * | 2/2010 | Suzuki et al. | 123/260 |
| 2010/0312454 A1 | 12/2010 | Nada et al. | |
| 2013/0073186 A1 * | 3/2013 | Morinaga et al. | 701/104 |
| 2013/0325297 A1 * | 12/2013 | Masubuchi | 701/104 |
| 2013/0345950 A1 * | 12/2013 | Goto et al. | 701/104 |
| 2014/0360471 A1 * | 12/2014 | Sugiyama et al. | 123/457 |

FOREIGN PATENT DOCUMENTS

| | | |
|---|---|---|
| JP | 8-158980 A | 6/1996 |
| JP | 8-284704 A | 10/1996 |
| JP | 11-148382 A | 6/1999 |
| JP | 2000-8897 A | 1/2000 |
| JP | 2003-120386 A | 4/2003 |
| JP | 2003-307140 A | 10/2003 |
| JP | 2008-51121 A | 3/2008 |
| JP | 2008-291718 A | 12/2008 |
| JP | 2009-138657 A | 6/2009 |
| JP | 2010-133337 A | 6/2010 |
| WO | 2005/031134 A1 | 4/2005 |

\* cited by examiner

CONTROL APPARATUS AND METHOD FOR AN INTERNAL COMBUSTION ENGINE

CROSS REFERENCE TO RELATED APPLICATIONS

This application is a National Stage of International Application No. PCT/JP2011/061034 filed May. 13, 2011, the contents of which are incorporated herein by reference in their entirety.

TECHNICAL FIELD

The present invention relates to a control apparatus for an internal combustion engine and a control method for an internal combustion engine.

BACKGROUND ART

There has been disclosed an internal combustion engine in which CNG (compressed natural gas), which is hard to be ignited, is used as a main fuel, and light oil, which is easy to be ignited, is used as an auxiliary fuel (for example, refer to a first patent document). In this internal combustion engine, when an operating state of the internal combustion engine is under light load, only light oil is used as fuel, but when it is under medium to high load, both fuels, CNG and light oil, are used. In addition, in cases where both the fuels, CNG and light oil, are used, light oil of necessary amount for ignition is used as the auxiliary fuel which is easy to be ignited so that CNG as the main fuel which is difficult to be ignited is caused to combust by igniting the light oil.

CITATION LIST

Patent Literature

PTL 1: Japanese patent application laid-open No. H08-158980
PTL 2: Japanese patent application laid-open No. 2008-051121
PTL 3: Japanese patent application laid-open No. 2010-133337
PTL 4: Japanese patent application laid-open No. H08-284704
PTL 5: Japanese patent application laid-open No. H11-148382
PTL 6: Japanese patent application laid-open No. 2003-307140
PTL 7: Japanese patent application laid-open No. 2009-138657

SUMMARY OF INVENTION

Technical Problem

In the technique of the above-mentioned first patent document, at a stage where the operating state of the internal combustion engine shifts from light load to medium load, the amount of light oil to be supplied is rapidly decreased until it becomes the least amount necessary for ignition. This is because the combustion of light oil changes its role from a source of power of the internal combustion engine to a source of ignition for combusting CNG. However, the combustion of CNG depends on the characteristics of fuel, and hence, when the amount of light oil to be supplied is rapidly decreased as in the technique of the above-mentioned first patent document, the internal combustion engine will misfire, and CNG will be discharged in an unburned state, thus giving rise to a fear that exhaust emissions may be deteriorated.

The present invention has been made in view of the above-mentioned circumstances, and has for its object to provide a technique of suppressing deterioration of exhaust emissions by causing good combustion to be carried out without excessively decreasing an amount of supply of a first fuel which is easy to be ignited.

Solutions to Problem

In the present invention, the following construction is adopted. That is, the present invention resides in a control apparatus for an internal combustion engine in which selective use is made of a case where a first fuel, being easy to be ignited, is singly caused to combust, and a case where a second fuel, being hard to be ignited, is also caused to combust by igniting said first fuel, and said apparatus comprising:

an acquisition unit configured to acquire a combustion state of said second fuel in the case where said second fuel is also caused to combust by igniting said first fuel; and a decision unit configured to decide an amount of supply of said first fuel and an amount of supply of said second fuel to be supplied to said internal combustion engine on and after next time, based on the combustion state of said second fuel acquired by said acquisition unit.

In the present invention, the combustion state of the second fuel is acquired by the acquisition unit, and the amount of supply of the first fuel and the amount of supply of the second fuel to be supplied to the internal combustion engine on and after next time are decided by the decision unit based on the combustion state of the second fuel. For this reason, in cases where the combustion state of the second fuel deteriorates, the amount of supply of the easily ignitable first fuel to be supplied to the internal combustion engine on and after next time can be increased, for example. As a result of this, a situation can be avoided in which in cases where the combustion state of the second fuel deteriorates, the amount of supply of the easily ignitable first fuel is decreased so that the internal combustion engine may misfire, and the second fuel may be discharged in an unburned state, thus deteriorating exhaust emissions. Accordingly, good combustion can be carried out, thereby making it possible to suppress the deterioration of exhaust emissions, without decreasing the amount of supply of the easily ignitable first fuel to an excessive extent.

It is preferable that in cases where the combustion state of said second fuel acquired by said acquisition unit is good, said decision unit decreases the amount of supply of said first fuel, and at the same time increases the amount of supply of said second fuel, whereas in cases where the combustion state of said second fuel acquired by said acquisition unit deteriorates, said decision unit increases the amount of supply of said first fuel, and at the same time decreases the amount of supply of said second fuel.

According to the present invention, in cases where the combustion state of the second fuel is good, the amount of consumption of the first fuel can be reduced by decreasing the amount of supply of the first fuel. On the other hand, in cases where the combustion state of the second fuel deteriorates, the amount of supply of the first fuel, which is easy to be ignited, is not decreased too much, thereby making it possible to cause good combustion.

It is preferable that said acquisition unit acquire the combustion state of said second fuel by distinguishing the combustion of said first fuel and the combustion of said second fuel from each other, based on an amount of heat generated at the time of combustion of said internal combustion engine.

At the time of combustion in the internal combustion engine, the hardly ignitable second fuel is also ignited by igniting the first fuel, so that the first fuel is first combusted to generate an amount of heat, and the second fuel is then combusted to generate an amount of heat. For this reason, the timing of generation for the amount of generated heat of the first fuel becomes different from the timing of generation for the amount of generated heat of the second fuel. Accordingly, from the amount of heat generated at the time of combustion in the internal combustion engine, it is possible to distinguish the combustion of the first fuel and the combustion of the second fuel from each other by means of their timing of generation, thus making it possible to acquire the combustion state of the second fuel based on the combustion of the second fuel thus distinguished.

It is preferable that said internal combustion engine be an engine which carries out a pilot injection of said first fuel inside a cylinder before a main injection, and that said acquisition unit acquire the combustion state of said second fuel from an amount of heat generated between said pilot injection and said main injection.

At the time of combustion in the internal combustion engine, by igniting the first fuel which has been pilot injected, the second fuel, which is hard to be ignited, is also caused to combust, so that the first fuel having been pilot injected is first combusted to generate an amount of heat, and the second fuel is then combusted to generate an amount of heat. Moreover, the first fuel, being injected as a main injection after that, is also combusted to generate an amount of heat. For this reason, the amount of generated heat of the first fuel, which has been pilot injected, and the amount of generated heat of the second fuel become different in the timing of generation from each other, and hence, between the pilot injection and the main injection, there exists an amount of heat which is generated by the combustion of only the second fuel. Accordingly, it is possible to specify the amount of heat generated by the combustion of only the second fuel from the amount of heat generated between the pilot injection and the main injection by the timing of generation thereof, and it is also possible to acquire the combustion state of the second fuel based on the amount of generated heat of the second fuel thus specified.

It is preferable that said internal combustion engine be an engine which mixes said second fuel into intake air before the pilot injection of said first fuel, and that said acquisition unit acquire the amount of heat generated between said pilot injection and said main injection, and that in cases where the amount of heat generated between said pilot injection and said main injection, which has been acquired by said acquisition unit, is equal to or more than a reference amount of generated heat, said decision unit decide that the combustion state of said second fuel is good, and decrease the amount of supply of said first fuel and at the same time increase the amount of supply of said second fuel.

Here, the reference amount of generated heat is a threshold value which becomes a boundary of determination as to whether or not the combustion state of the second fuel is good, made based on the heat generated between the pilot injection and the main injection. According to the present invention, in cases where the amount of heat generated between the pilot injection and the main injection is equal to or more than the reference amount of generated heat, and the combustion state of the second fuel is good, the amount of supply of the first fuel can be decreased, thereby making it possible to reduce the amount of consumption of the first fuel.

It is preferable that said decision unit decrease the amount of supply of said first fuel for said main injection, and at the same time increase the amount of supply of said second fuel so that an amount of heat generated thereby becomes equal to an amount of heat generated by an amount of decrease in the supply of said first fuel.

According to the present invention, an amount of main generated heat can be obtained from the second fuel, while igniting the second fuel by the pilot injection of the first fuel.

It is preferable that said acquisition unit acquire the combustion state of said second fuel from exhaust gas components discharged from said internal combustion engine.

At the time of combustion in the internal combustion engine, those exhaust gas components which are discharged due to the combustion of the first fuel are different from those exhaust gas components which are discharged due to the combustion of the second fuel. Accordingly, the combustion state of the second fuel can be acquired based on the amount of exhaust gas components discharged due to the combustion of the second fuel in the exhaust gas components discharged from the internal combustion engine.

It is preferable that processing of said acquisition unit and said decision unit be carried out at a stage at which the combustion in said internal combustion engine shifts from a case where said first fuel is caused to combust singly or independently into a case where said second fuel is also caused to combust by the ignition of said first fuel.

According to the present invention, at the stage at which the combustion in the internal combustion engine shifts from the case where the first fuel is caused to combust singly or independently into the case where the second fuel is also caused to combust by the ignition of the first fuel, good combustion is caused to be carried out without excessively decreasing the amount of supply of the first fuel which is easy to be ignited, thereby making it possible to suppress the deterioration of exhaust emissions.

In the present invention, the following construction is also adopted. That is, the present invention resides in a control method for an internal combustion engine in which selective use is made of a case where a first fuel, being easy to be ignited, is singly caused to combust, and a case where a second fuel, being hard to be ignited, is also caused to combust by igniting said first fuel, and said control method comprising:

a step of acquiring, by an acquisition unit, a combustion state of said second fuel in the case where said second fuel is also caused to combust by igniting said first fuel; and a step of deciding, by a decision unit, an amount of supply of said first fuel and an amount of supply of said second fuel supplied to said internal combustion engine on and after next time based on the combustion state of said second fuel determined by said acquisition unit.

According to this aspect of the present invention, too, good combustion can be caused to be carried out, without excessively decreasing the amount of supply of the first fuel, which is easy to be ignited, so that it is possible to suppress the deterioration of exhaust emissions.

Advantageous Effects of Invention

According to the present invention, good combustion can be caused to be carried out, without excessively decreasing the amount of supply of the first fuel, which is easy to be ignited, so that it is possible to suppress the deterioration of exhaust emissions.

DESCRIPTION OF EMBODIMENTS

Hereinafter, a specific embodiment of the present invention will be described.

<First Embodiment>

Figure 1:
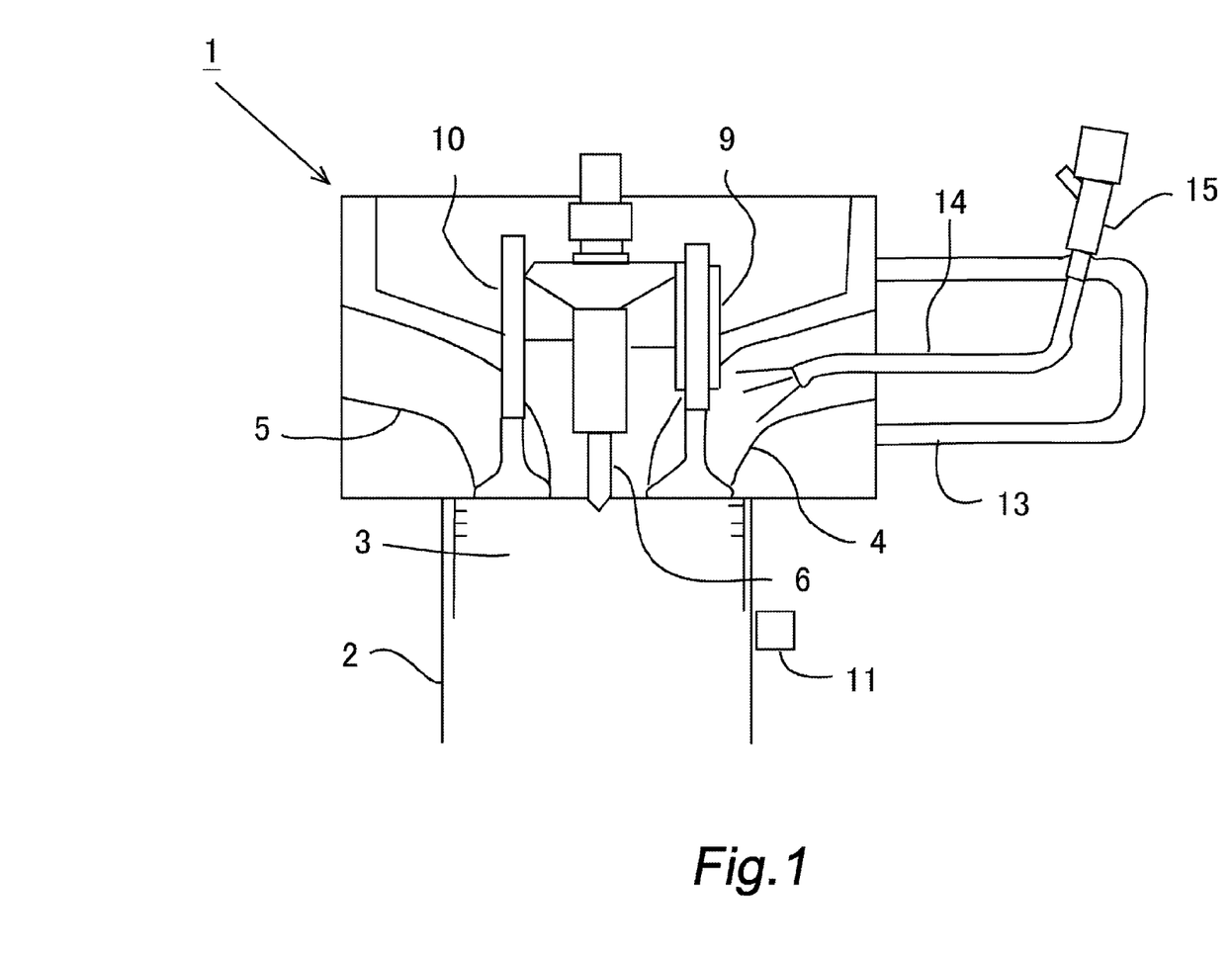
FIG. 1 is a view showing a schematic cross section of an internal combustion engine according to a first embodiment of the present invention.
Figure 2:
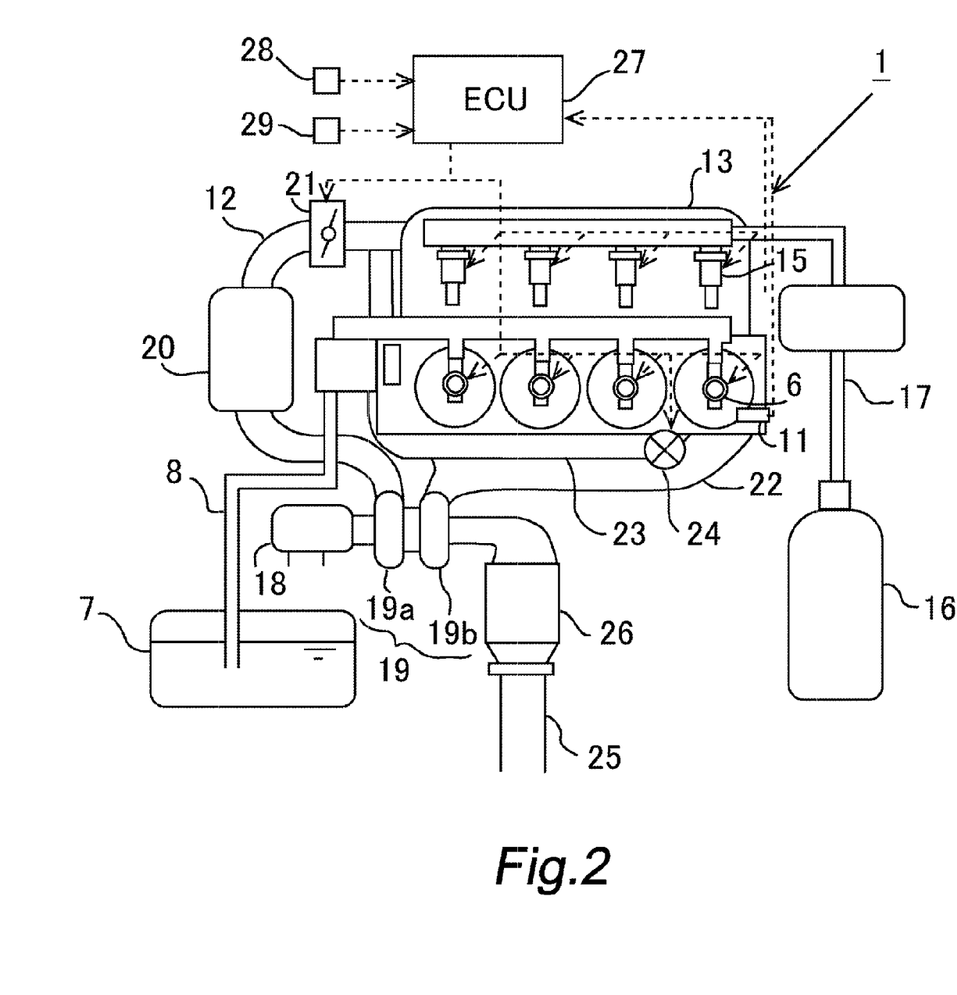
FIG. 2 is a view showing the schematic construction of the internal combustion engine according to the first embodiment.

FIG. 1 is a view showing a schematic cross section of an internal combustion engine to which a control apparatus for an internal combustion engine according to a first embodiment of the present invention is applied. FIG. 2 is a view showing the schematic construction of the internal combustion engine according to this embodiment. The internal combustion engine 1 is a compression-ignition internal combustion engine such as a diesel engine, for example. As fuel for the internal combustion engine 1, there are used light oil and CNG (compressed natural gas). The light oil corresponds to a first fuel of the present invention which is easy to be ignited. The first fuel, being easy to be ignited, can also be said to be a fuel which can be compression ignited, by using light oil. The CNG corresponds to a second fuel of the present invention which is hard to be ignited. As the second fuel being hard to be ignited, there can be used a hardly ignitable fuel such as gas fuel containing methane as its main component, besides CNG. In the internal combustion engine 1, light oil can be caused to combust singly or independently. In addition, the internal combustion engine 1 uses, as a main fuel, CNG which is hard to be ignited, and as auxiliary fuel, light oil which is easy to be ignited, wherein both of these fuels are supplied into a cylinder 2, so that the light oil is ignited to form a pilot flame by means of compression ignition, thereby causing the CNG to combust by the use of the pilot frame. In other words, the internal combustion engine 1 properly or selectively uses a case where the light oil, which is easy to be ignited, is caused to combust singly or independently, and a case where the CNG, which is hard to be ignited, is caused to combust by igniting the light oil.

In an upper portion inside the cylinder 2 of the internal combustion engine 1, there is defined a combustion chamber 3 by means of an upper wall and an inner wall of the cylinder 2 and a top surface of an unillustrated piston arranged at a lower portion therein. An intake port 4 and an exhaust port 5 are connected to an upper portion of the combustion chamber 3. In the center of the upper portion of the cylinder 2 to which the intake port 4 and the exhaust port 5 are connected, there is arranged a light oil injection valve 6 which serves to inject light oil into the cylinder 2. The light oil stored in a light oil tank 7 is supplied to the light oil injection valve 6 through a light oil supply system 8. An opening portion of the intake port 4 to the combustion chamber 3 is opened and closed by an intake valve 9. An opening portion of the exhaust port 5 to the combustion chamber 3 is opened and closed by an exhaust valve 10. In addition, on the cylinder 2, there is mounted a cylinder internal pressure sensor 11 which serves to detect the pressure inside the cylinder. An amount of heat generated inside the cylinder 2 can be acquired by a detected value of the cylinder internal pressure sensor 11. The cylinder internal pressure sensor 11 corresponds to an acquisition unit of the present invention.

An intake manifold 13, which leads to an intake pipe 12, is connected to an upstream side of the intake port 4. In an upper portion of the intake manifold 13, there is arranged a CNG injection valve 15 which serves to inject CNG into the intake port 4 through a distribution pipe 14 which leads from the upper portion of the intake manifold 13 to the intake port 4. The CNG stored in a CNG tank 16 is supplied to the CNG injection valve 15 through a CNG supply system 17. Here, note that the CNG injection valve 15 may be arranged in such a manner as to inject CNG into the cylinder 2. In the intake pipe 12, there are arranged, sequentially from an upstream side thereof, an air cleaner 18, a compressor 19a of a turbocharger 19, an intercooler 20, and a throttle valve 21.

The intake air taken into the intake pipe 12 from outside the internal combustion engine flows through the intake manifold 13, and in cases where CNG is used for fuel, the CNG is injected into the intake air by the CNG injection valve 15 in the intake port 4, so that the CNG and the intake air are sucked into the cylinder 2. Light oil is injected into the intake air sucked into the cylinder 2 by the light oil injection valve 6 at appropriate timing such as at a compression stroke. The injection of light oil is divided into pilot injection and main injection. In cases where light oil is independently used for fuel, when the piston goes up toward compression top dead center, first, pilot injection of light oil is carried out from the light oil injection valve 6, so that the light oil is ignited to burn by compression of the intake air, thus once making the temperature in the interior of the cylinder low, and then, main injection of light oil is carried out from the light oil injection valve 6 so that the light oil is ignited to burn by compression of the intake air. On the other hand, in cases where light oil and CNG are used for fuel, CNG is injected from the CNG injection valve 15 to be mixed with the intake air before the pilot injection of light oil, so that the intake air having the CNG contained therein is made to exist in the cylinder 2. Then, when the piston goes up toward the compression top dead center, pilot injection of light oil is carried out from the light oil injection valve 6, so that the light oil is ignited to burn by compression of intake air, and the CNG, which is hard to be ignited, is also caused to burn, using this burning of the light oil as a spark or seed of fire. Here, note that in cases where light oil and CNG are used for fuel, main injection of light oil may also be carried out in order to make the combustion thereof better.

An exhaust manifold 22 is connected to the exhaust port 5 of the internal combustion engine 1. Between the exhaust manifold 22 and the intake pipe 12, there is arranged an EGR pipe 23 which serves to recirculate an EGR gas which is a part of the exhaust gas. An EGR valve 24 for adjusting an amount of the EGR gas flowing through the EGR pipe 23 is arranged in the EGR pipe 23. An exhaust pipe 25 is connected to a downstream side of the exhaust manifold 22 through a turbine 19b of the turbocharger 19. An exhaust gas purification device 26 for purifying the exhaust gas is arranged in the exhaust pipe 25. The exhaust gas after having combusted or burned in the cylinder 2 flows out of the exhaust port 5 into the exhaust manifold 22, drives the turbine 19b, and is discharged to the outside of the internal combustion engine after having been purified by the exhaust gas purification device 26 in the exhaust pipe 25.

In the internal combustion engine 1, there is arranged in combination therewith an ECU (Electronic Control Unit) 27 for controlling the internal combustion engine 1. The ECU 27 is a unit that controls the operating state of the internal combustion engine 1 in accordance with the operating conditions of the internal combustion engine 1 and/or driver's requirements. A variety of kinds of sensors such as an accelerator opening sensor 28, a crank angle sensor 29, and so on are connected to the ECU 27 through electrical wiring, so that output signals of these various sensors are inputted to the ECU 27. On the other hand, the light oil injection valve 6, the CNG injection valve 15, the throttle valve 21, the EGR valve 24, and so on are connected to the ECU 27 through electrical wiring, so that these valves are controlled by means of the ECU 27.

Then, in cases where light oil is independently used for fuel, the ECU 27 controls the light oil injection valve 6 so that light oil is injected from the light oil injection valve 6 by means of pilot injection and main injection. On the other hand, in cases where light oil and CNG are used for fuel, CNG, which is hard to be ignited, is caused to be injected from the CNG injection valve 15 as main fuel, and light oil, which is easy to be ignited, is caused to be injected as pilot injection from the light oil injection valve 6 as auxiliary fuel. Moreover, when a shift is made from the case where light oil is independently used for fuel to the case where light oil and CNG are used for fuel, main injection of light oil is carried out from the light oil injection valve 6, in addition to causing CNG, which it is hard to be ignited, to be injected from the CNG injection valve 15 as main fuel, and light oil, which is easy to be ignited, to be injected as pilot injection from the light oil injection valve 6 as auxiliary fuel.

(Shift Time Control)

Now, reference will be made to control at the time of shifting from the case where light oil is independently used for fuel to the case where light oil and CNG are used for fuel. This shift of fuels to be used is carried out in order to consume both of the fuels in a well balanced manner as much as possible, due to the fact that the internal combustion engine 1 has two fuels, light oil and CNG, mounted thereon. Here, at the time of shifting, the combustion of light oil changes its role from a source of power of the internal combustion engine to a source of ignition for combusting CNG. In the past, upon shifting, the amount of supply of light oil has been rapidly decreased until it has become the least amount necessary for ignition. If doing so, however, the combustion of CNG depends on the characteristics of fuel, and hence, even if light oil is used as a source of ignition, the internal combustion engine 1 may misfire, and CNG will be discharged in an unburned state, thus giving rise to a situation that exhaust emissions may be deteriorated. In order to cope with this, it has been desired that the amount of supply of the easily ignitable light oil be not decreased to an excessive extent, so that good combustion is caused to be carried out, thereby suppressing the deterioration of exhaust emissions.

Accordingly, in this embodiment, a combustion state of CNG in the case where the CNG is also caused to burn or combust by igniting light oil is acquired, and an amount of supply of light oil and an amount of supply of CNG to be supplied to the internal combustion engine 1 on and after next time are decided based on the combustion state of CNG thus acquired.

Figure 3:
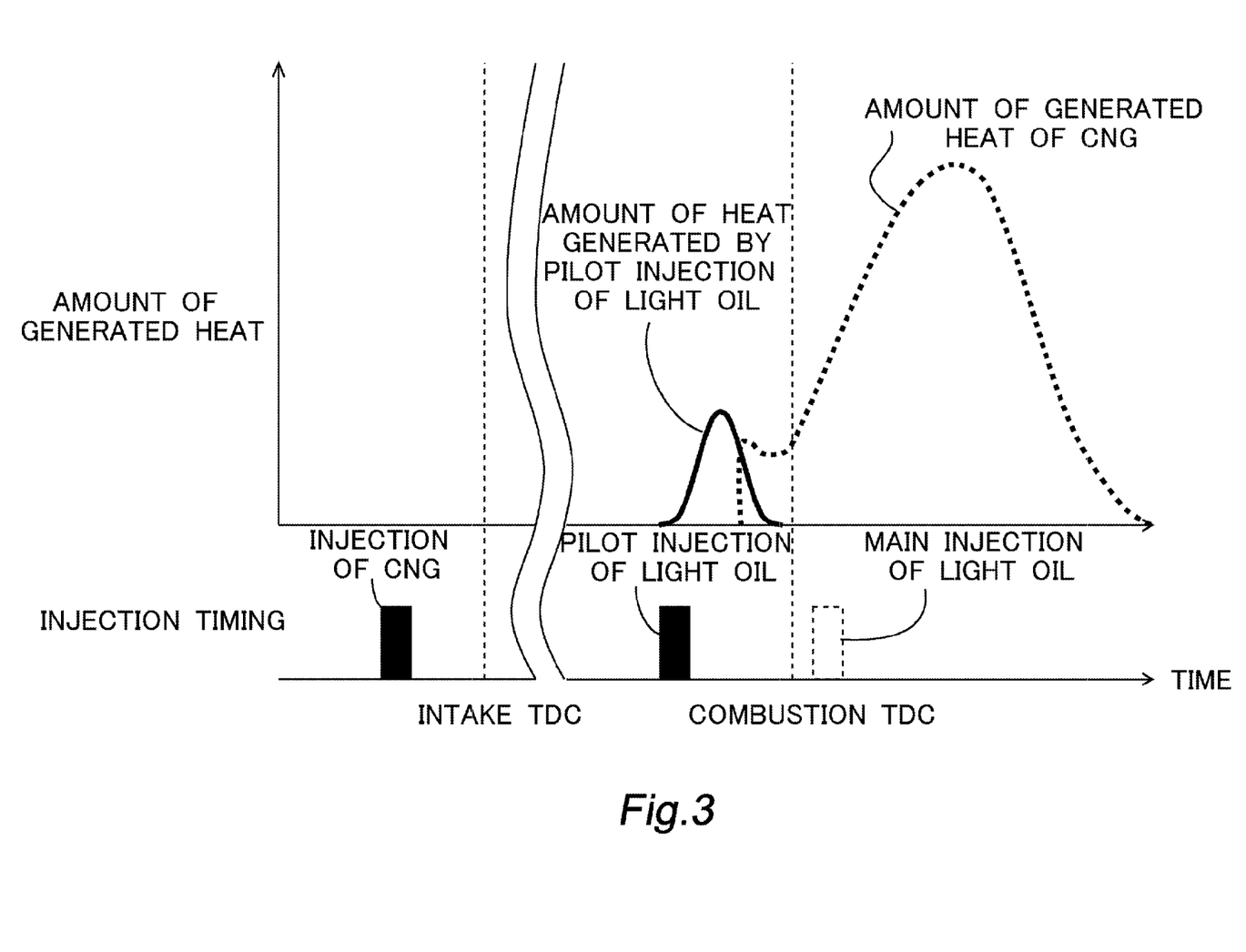
FIG. 3 is a view showing an amount of generated heat with respect to time, at the time of mixed combustion of light oil and CNG according to the first embodiment.
Figure 4:
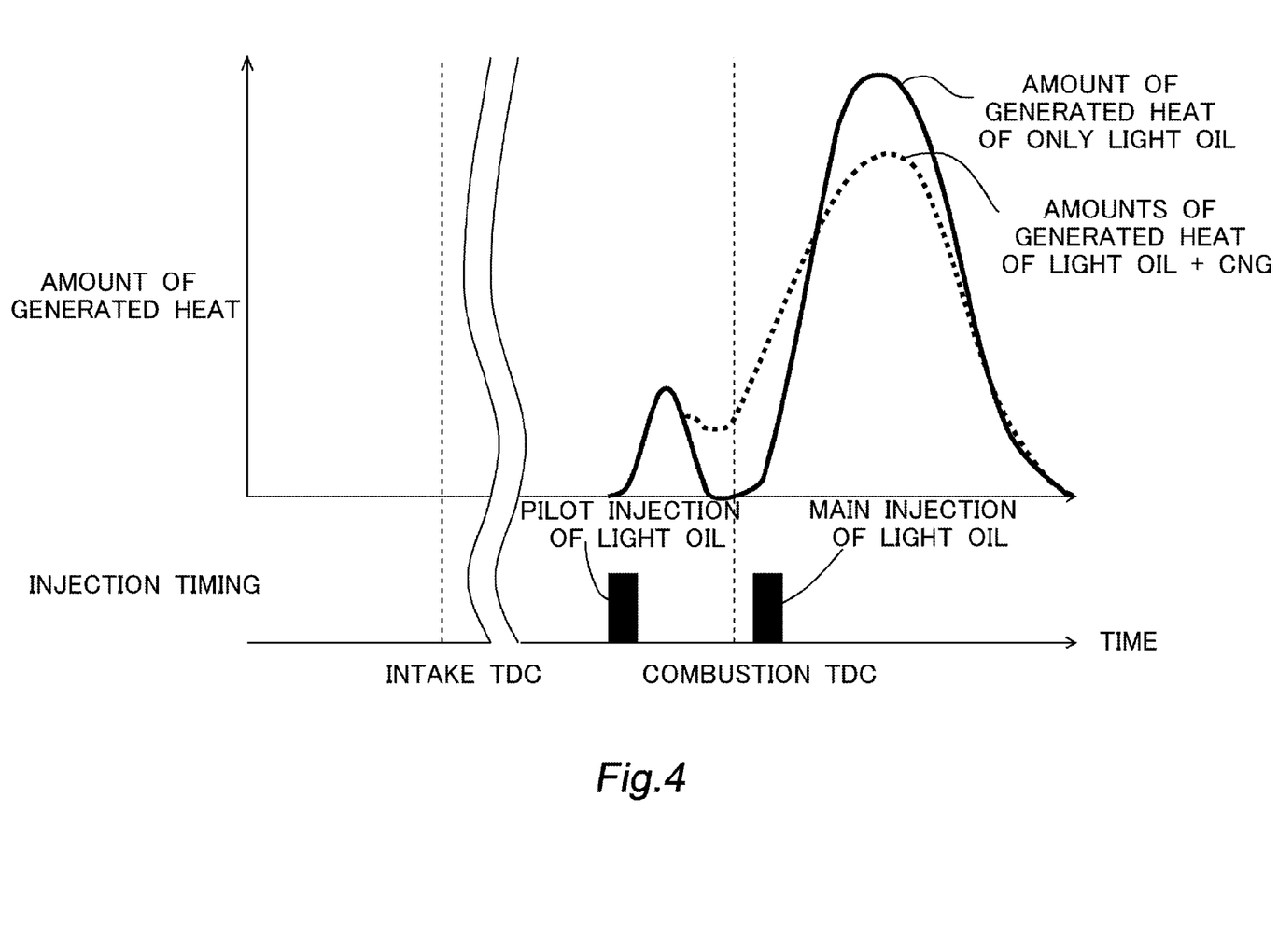
FIG. 4 is a view showing an amount of generated heat with respect to time, at the time of single combustion of light oil according to the first embodiment.

Here, in this embodiment, acquiring the combustion state of CNG in the case where the CNG is also caused to burn or combust by igniting light oil is carried out by the use of the cylinder internal pressure sensor 11. In other words, the cylinder internal pressure sensor 11 detects from the cylinder internal pressure the amount of generated heat at the time of mixed combustion of light oil and CNG in the internal combustion engine 1, and acquires the combustion state of CNG, by distinguishing from this amount of generated heat, the combustion of light oil and the combustion of CNG from each other. Specifically, the cylinder internal pressure sensor 11 acquires the combustion state of CNG from an amount of heat generated between the pilot injection and the main injection. FIG. 3 is a view showing an amount of generated heat with respect to time, at the time of the mixed combustion of light oil and CNG according to this embodiment. At the time of the mixed combustion of light oil and CNG in the internal combustion engine 1, by igniting the light oil which has been pilot injected, the CNG, which is hard to be ignited, is also caused to combust, so that the light oil having been pilot injected is first combusted to generate an amount of heat as indicated by a solid line in FIG. 3, and the CNG is then combusted to generate an amount of heat as indicated by a broken line in FIG. 3. For this reason, the amount of generated heat of the light oil, which has been pilot injected, and the amount of generated heat of the CNG become different in the timing of generation from each other, and hence, in this case, as indicated by the broken line in FIG. 3 in the vicinity of combustion TDC, there exists an amount of heat generated by the combustion of only the CNG between the pilot injection and the main injection. FIG. 4 is a view showing an amount of generated heat with respect to time, at the time of single or independent combustion of light oil according to this embodiment. In contrast to the above, in cases where only light oil is caused to combust, as indicated by a solid line in FIG. 4 in the vicinity of combustion TDC, there exists a period of time in the absence of an amount of generated heat between the pilot injection and the main injection. As a result, it is possible to specify the amount of heat generated by the combustion of only the CNG from the amount of heat generated between the pilot injection and the main injection by its timing of generation, and it is also possible to acquire the combustion state of the CNG based on the amount of generated heat of the CNG thus specified.

The ECU 27, which decides an amount of supply of light oil and an amount of supply of CNG to be supplied to the internal combustion engine 1 on and after next time based on the combustion state of CNG thus acquired, corresponds to a decision unit of the present invention. In cases where the amount of heat generated between the pilot injection and the main injection, which has been acquired by the cylinder internal pressure sensor 11, is equal to or more than a reference amount of generated heat, the ECU 27 decides that the combustion state of the CNG is good, and decreases the amount of supply of the light oil for main injection, and at the same time increases the amount of supply of the CNG so that an amount of heat generated thereby becomes equal to an amount of heat generated by an amount of decrease in the supply of the light oil. In addition, in cases where the amount of heat generated between the pilot injection and the main injection, which has been acquired by the cylinder internal pressure sensor 11, is less than the reference amount of generated heat, the ECU 27 decides that the combustion state of the CNG has deteriorated, and increases the amount of supply of the light oil for main injection, and at the same time decreases the amount of supply of the CNG so that an amount of heat generated thereby becomes equal to an amount of heat generated by an amount of increase in the supply of the light oil. According to this, an amount of main generated heat can be obtained from the CNG, while igniting the CNG by the pilot injection of the light oil. Here, note that in cases where there exists an amount of heat generated between the pilot injection and the main injection, which has been acquired by the cylinder internal pressure sensor 11, and in cases where an entire amount of heat generated in one cycle including the amount of heat generated between the pilot and main injections is equal to or more than the reference amount of generated heat, the ECU 27 may decide that the combustion state of the CNG is good, and may decrease the amount of supply of the light oil for main injection, and at the same time increase the amount of supply of the CNG so that an amount of heat generated thereby becomes equal to an amount of heat generated by an amount of decrease in the supply of the light oil.

Here, the reference amount of generated heat is a threshold value in which when the amount of heat generated is equal to or more than that, it can be determined that the combustion state of the CNG is good, and when less than that, it can be determined that the combustion state of the CNG has deteriorated.

According to this embodiment, in cases where the combustion state of the CNG is good, the amount of consumption of the light oil can be reduced by decreasing the amount of supply of the light oil. On the other hand, in cases where the combustion state of the CNG deteriorates, the amount of supply of the light oil, which is easy to be ignited, is not decreased too much, thereby making it possible to cause good combustion. As a result of this, a situation can be avoided in which in cases where the combustion state of the CNG deteriorates, the amount of supply of the light oil, which is easy to be ignited, is decreased, and even if the light oil is used as a source of ignition, the CNG will not be burned, so that the internal combustion engine may misfire, and the CNG may be discharged in an unburned state, thus deteriorating exhaust emissions. Accordingly, at a stage at which the combustion in the internal combustion engine 1 shifts from a case where the light oil is caused to combust singly or independently into a case where the CNG is also caused to combust by the ignition of the light oil, good combustion is caused to be carried out without excessively decreasing the amount of supply of the light oil which is easy to be ignited, thereby making it possible to suppress the deterioration of exhaust emissions.

(Shift Time Control Routine)

Figure 5:
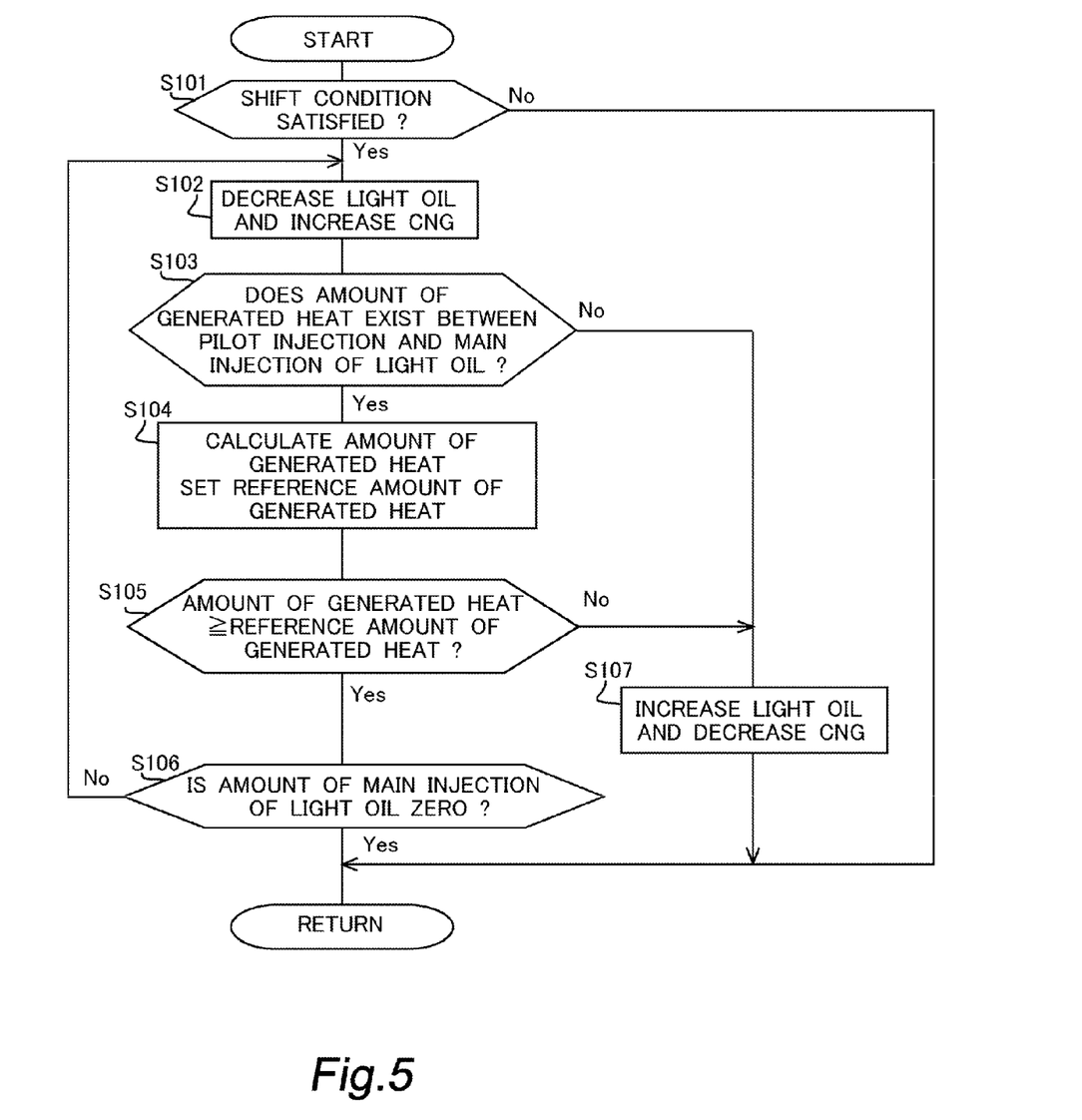
FIG. 5 is a flow chart showing a shift time control routine according to the first embodiment.

FIG. 5 is a flow chart showing a shift time control routine according to this embodiment. The shift time control routine will be explained based on the flow chart shown in FIG. 5. This routine is repeatedly carried out by means of the ECU 27 at each predetermined time interval.

When this routine is carried out, first, in step S101, it is determined whether or not a condition is satisfied for shifting from the case where light oil is independently used for fuel to the case where light oil and CNG are used for fuel. This shift condition is satisfied in cases where the internal combustion engine 1 is run until a target torque so that the target torque has been reached, or in cases where a predetermined period of time has elapsed after this routine was carried out last time, or the like. In cases where an affirmative determination is made in step S101, the routine advances to step S102. On the other hand, in cases where a negative determination is made in step S101, this routine is once ended.

In step S102, the amount of supply of the light oil for main injection is decreased, and at the same time, the amount of supply of the CNG is increased so that an amount of heat generated thereby becomes equal to an amount of heat generated by an amount of decrease in the supply of the light oil.

In step S103, it is determined by the cylinder internal pressure sensor 11 whether there exists an amount of heat generated between the pilot injection and the main injection. When an amount of generated heat has occurred between the pilot injection and the main injection, as shown in the broken line in FIG. 3 in the vicinity of combustion TDC, the CNG will be burned or combusted. In cases where an affirmative determination is made in step S103, the routine advances to step S104. On the other hand, in cases where a negative determination is made in step S103, the routine advances to step S107.

In S104, the amount of heat generated between the pilot injection and the main injection is calculated, and at the same time, the reference amount of generated heat is set. The amount of heat generated between the pilot injection and the main injection is calculated from an output value of the cylinder internal pressure sensor 11. The reference amount of generated heat is a threshold value which becomes a boundary of determination as to whether or not the combustion state of the CNG is good, made based on the heat generated between the pilot injection and the main injection. The reference amount of generated heat is derived by the use of a map, etc., in which it is correlated with the amount of supply of light oil for main injection, the amount of supply of CNG, etc. After the processing of S104, the routine advances to S105.

In step S105, it is determined whether the amount of heat generated between the pilot injection and the main injection is equal to or more than the reference amount of generated heat. When the amount of heat generated between the pilot injection and the main injection is equal to or more than the reference amount of generated heat, a determination can be made that the combustion state of the CNG is good. On the other hand, when the amount of heat generated between the pilot injection and the main injection is less than the reference amount of generated heat, a determination can be made that the combustion state of the CNG has deteriorated. In cases where an affirmative determination is made in step S105, the routine advances to step S106. On the other hand, in cases where a negative determination is made in step S105, the routine advances to step S107. Here, note that in this embodiment, for a comparison between the amount of generated heat and the reference amount of generated heat in step S105, the amount of heat generated between the pilot injection and the main injection is adopted. However, the present invention is not limited to this. A comparison may be made between an entire amount of generated heat in one cycle and a reference amount of generated heat. In other words, it is determined whether an amount of generated heat exists between the pilot injection and the main injection, and it is further determined whether an entire amount of generated heat in one cycle including that amount of generated heat is equal to or more than the reference amount of generated heat, wherein when the entire amount of generated heat is equal to or more than the reference amount of generated heat, a determination may be made that the combustion state of the CNG is good.

In S106, it is determined whether the amount of supply of the light oil for main injection has become zero. In cases where an affirmative determination is made in step S106, this routine is once ended. On the other hand, in cases where a negative determination is made in step S106, the routine advances to step S102.

On the other hand, in step S107 shifted from step S103 or S105, the amount of supply of the light oil for main injection is increased, and at the same time, the amount of supply of the CNG is decreased so that an amount of heat generated thereby becomes equal to an amount of heat generated by an amount of increase in the supply of the light oil. The amounts of increase and decrease of the fuels in step S107 may be made larger than the amounts of increase and decrease of the fuels in step S102. After the processing of S107, this routine is once ended.

According to this routine as explained above, in cases where the combustion state of the CNG is good, the amount of consumption of the light oil can be reduced by decreasing the amount of supply of the light oil, and thereafter, the shift can be completed. On the other hand, in cases where the combustion state of the CNG deteriorates, the amount of supply of the light oil, which is easy to be ignited, is not decreased too much, so that good combustion can be made.

<Other Examples>

In the above-mentioned embodiment, the cylinder internal pressure sensor 11 is used as the acquisition unit. However, the present invention is not limited to this. As the acquisition unit, a methane sensor for detecting methane ($CH_4$) in the exhaust gas components discharged from the internal combustion engine 1 may be arranged in an exhaust passage of the internal combustion engine 1. At the time of combustion in the internal combustion engine 1, those exhaust gas components which are discharged due to the combustion of light oil are different from those exhaust gas components which are discharged due to the combustion of CNG. A lot of methane ($CH_4$) is discharged which is a main component in the exhaust gas components discharged due to the combustion of CNG. Accordingly, the combustion state of the CNG can be acquired based on the amount of the exhaust gas components, such as for example the amount of methane ($CH_4$), discharged due to the combustion of the CNG, in the exhaust gas components discharged from the internal combustion engine 1.

<Others>

The control apparatus for an internal combustion engine according to the present invention is not limited to the above-mentioned embodiment, but can be subjected to various changes and modifications within the scope not departing from the gist of the present invention. In addition, the above-mentioned embodiment is also an embodiment of a control method for an internal combustion engine according to the present invention.

REFERENCE SIGNS LIST 1 internal combustion engine
2 cylinder
3 combustion chamber
4 intake port
5 exhaust port
6 light oil injection valve
7 light of tank
8 light oil supply system
9 intake valve
10 exhaust valve
11 cylinder internal pressure sensor
12 intake pipe
13 intake manifold
14 distribution pipe
15 CNG injection valve
16 CNG tank
17 CNG supply system
18 air cleaner
19 turbocharger
19a compressor
19b turbine
20 intercooler
21 throttle valve
22 exhaust manifold
23 EGR pipe
24 EGR valve
25 exhaust pipe
26 exhaust gas purification device
27 ECU
28 accelerator opening sensor
29 crank angle sensor

The invention claimed is:

1. A control method for an internal combustion engine in which selective use is made of a case where a first fuel, being easy to be ignited, is singly caused to combust, and a case where a second fuel, being hard to be ignited, is also caused to combust by igniting said first fuel, wherein the first fuel is injected in a cylinder in two steps of a pilot injection and a main injection which is carried out after the pilot injection, and the second fuel is mixed with intake air before the pilot injection of said first fuel, said method comprising:

a step of acquiring a combustion state of said second fuel in the case where said second fuel is also caused to combust by igniting said first fuel, from an amount of heat generated during a time period from the pilot injection of said first fuel until the main injection of said first fuel; and a step of deciding that the combustion state of said second fuel is good, and decreasing the amount of supply of the main injection of said first fuel and at the same time increasing the amount of supply of said second fuel, in cases where the amount of generated heat during a time period from said pilot injection until said main injection acquired in the step of acquiring is equal to or more than a reference amount of generated heat, and further deciding that the combustion state of said second fuel is not good, and increasing the amount of supply of said first fuel and at the same time decreasing the amount of supply of the main injection of said second fuel, in cases where the amount of generated heat during a time period from said pilot injection until said main injection acquired in the step of acquiring is less than the reference amount of generated heat.

2. A control apparatus for an internal combustion engine in which selective use is made of a case where a first fuel, being easy to be ignited, is singly caused to combust, and a case where a second fuel, being hard to be ignited, is also caused to combust by igniting said first fuel, wherein the first fuel is injected in a cylinder in two steps of a pilot injection and a main injection which is carried out after the pilot injection, and the second fuel is mixed with intake air before the pilot injection of said first fuel, said apparatus comprising one or more processors that operate as:

an acquisition unit configured to acquire a combustion state of said second fuel in the case where said second fuel is also caused to combust by igniting said first fuel, from an amount of heat generated during a time period from the pilot injection of said first fuel until the main injection of said first fuel; and a decision unit configured to decide that the combustion state of said second fuel is good, and to decrease the amount of supply of the main injection of said first fuel and at the same time to increase the amount of supply of said second fuel, in cases where the amount of generated heat during a time period from said pilot injection until said main injection acquired by said acquisition unit is equal to or more than a reference amount of generated heat, and further configured to decide that the combustion state of said second fuel is not good, and to increase the amount of supply of the main injection of said first fuel and at the same time to decrease the amount of supply of said second fuel, in cases where the amount of generated heat during a time period from said pilot injection until said main injection acquired by said acquisition unit is less than the reference amount of generated heat.

3. The control apparatus for an internal combustion engine as set forth in claim 2, wherein
in cases where the combustion state of said second fuel is good, said decision unit decreases the amount of supply of said first fuel for said main injection, and at the same time increases the amount of supply of said second fuel so that an amount of heat which can be generated by the decrease in the first fuel is equal to an amount of heat generated which can be generated by the increase in the second fuel.

4. The control apparatus for an internal combustion engine as set forth in claim 2, wherein
processing of said acquisition unit and said decision unit is carried out at a stage at which the combustion of said internal combustion engine shifts from a case where said first fuel is singly caused to combust into a case where said second fuel is also caused to combust by the ignition of said first fuel.

5. The control apparatus for an internal combustion engine as set forth in claim 3, wherein
processing of said acquisition unit and said decision unit is carried out at a stage at which the combustion of said internal combustion engine shifts from a case where said first fuel is singly caused to combust into a case where said second fuel is also caused to combust by the ignition of said first fuel.

* * * * *